R. H. OITTO.
FEED BAG FOR HORSES.
APPLICATION FILED AUG. 30, 1916.
1,259,897. Patented Mar. 19, 1918.
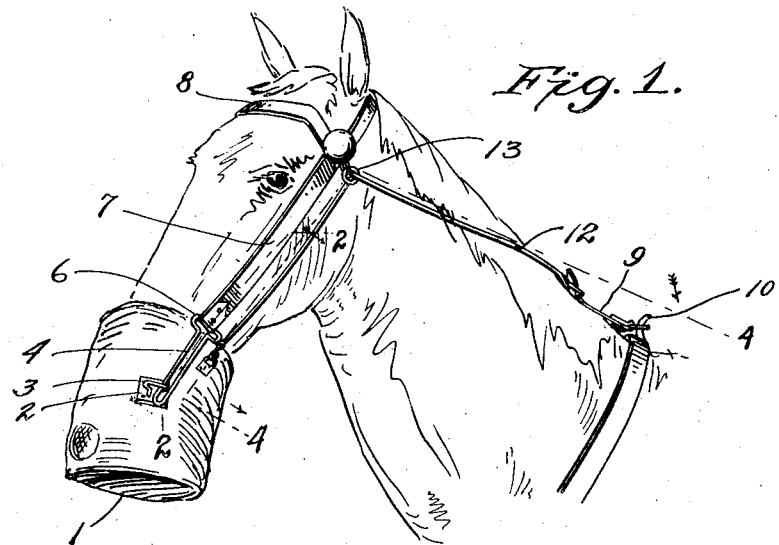
Fig. 1.
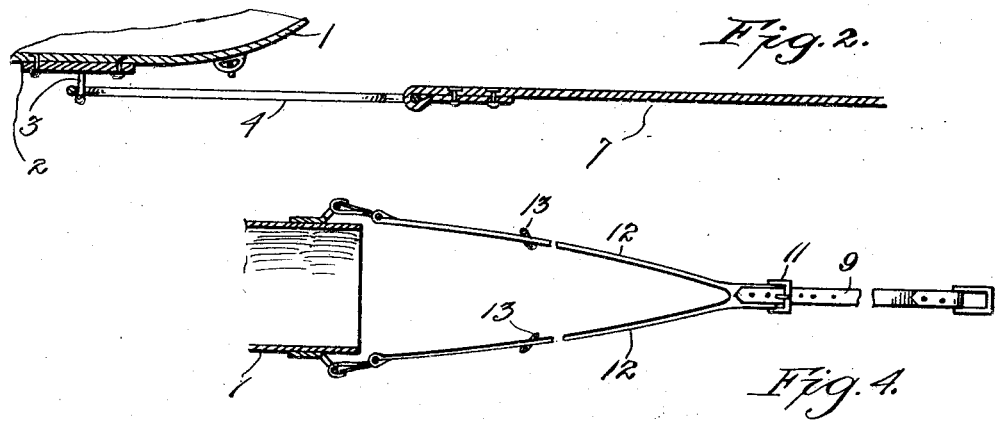
Fig. 2.
Fig. 4.
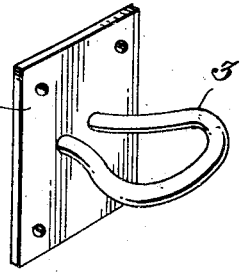
Fig. 3.
Witnesses
Inventor
R. H. Oitto
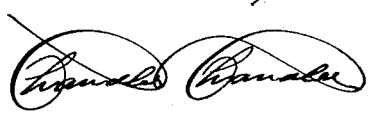
By
Attorney

UNITED STATES PATENT OFFICE.

RICHARD H. OITTO, OF NEMO, SOUTH DAKOTA.

FEED-BAG FOR HORSES.

1,259,897.  Specification of Letters Patent.  Patented Mar. 19, 1918.

Application filed August 30, 1916. Serial No. 117,787.

*To all whom it may concern:*

Be it known that I, RICHARD H. OITTO, a citizen of the United States, residing at Nemo, in the county of Lawrence, State of South Dakota, have invented certain new and useful Improvements in Feed-Bags for Horses; and I do hereby declare the following to be a full, clear, and exact description of the invention, such as will enable others skilled in the art to which it appertains to make and use the same.

The present invention is directed to improvements in feed bags for horses, and has for its object to so construct a device of this character that the bag will be so supported that when the horse moves his head downwardly the bag will move upwardly.

A further object of the invention is to provide a feed bag for this purpose which can be easily applied to the head of the animal and when in place thereon the movement of the bag will be controlled by the movement of the head of the animal so that the animal can reach the feed upon the bottom of the bag.

It is a well known fact that the conventional form of feed bag is so constructed that the horse is compelled to throw his head upwardly to reach the feed on the bottom of the bag, and it is to overcome this objection that the present invention has been perfected.

With these and other objects in view, this invention resides in the novel features of construction, formation, combination and arrangement of parts to be hereinafter more fully described, claimed and illustrated in the accompanying drawing in which:—

Figure 1 is a side elevation of the device.

Fig. 2 is a sectional view on line 2—2 of Fig. 1.

Fig. 3 is a detail perspective view of one of the eye plates.

Fig. 4 is a sectional view on line 4—4 of Fig. 1.

Referring to the drawing 1 indicates the feed bag which has suitably secured to its sides plates 2, said plates having supported thereto laterally extending eyes 3, the purpose of which will appear later.

A pair of loops 4 are provided, said loops being formed preferably from stout wire and have the upper ends of their legs 5 terminating in horizontal loops 6 which are engaged by the lower ends of the head strap 7, said head strap having a brow band 8 secured thereto so as to properly hold the strap 7 engaged with the head of the animal.

A strap 9 is provided and has its rear end connected to the check hook 10, while the forward end of said strap has adjustably engaged therewith a buckle 11, said buckle having connected thereto rear ends of the straps 12, the forward ends of said straps, after being passed through the rings 13 carried by the straps 7 are engaged with the bag 1.

It will be noted that one of the legs 5 of the loops 4 is slidably engaged with the eyes 3 so that when the animal lowers its head the bag 1 will be drawn upwardly, and at which time the legs 5 slide in the eyes 3, thus permitting the animal to obtain all the feed within the bag. Heretofore the animal in an attempt to obtain the feed in the bag would quickly jerk the head upwardly with the consequent loss of feed from the bag.

What is claimed is:—

A device of the class described, comprising a head strap having portions arranged to lie longitudinally of the cheeks of a horse and having pivotally connected to their lower ends elongated loops, a receptacle provided with eyes at diametrically opposite points of its sides and through each of which eyes a side of a corresponding loop is slidingly engaged, and flexible members connected with the upper portion of the receptacle and having slidable connection with the head strap and adapted at their upper ends for connection with a fixed portion of a harness.

In testimony whereof, I affix my signature, in the presence of two witnesses.

RICHARD H. OITTO.

Witnesses:
 P. K. EDWARDS,
 JUSTUS LINDSTROM.

Copies of this patent may be obtained for five cents each, by addressing the "Commissioner of Patents. Washington, D. C."